(12) United States Patent  (10) Patent No.: US 8,744,171 B1
Smith et al.  (45) Date of Patent: Jun. 3, 2014

(54) TEXT SCRIPT AND ORIENTATION RECOGNITION

(75) Inventors: Raymond W. Smith, Mountain View, CA (US); Ranjith Unnikrishnan, Mountain View, CA (US)

(73) Assignee: Google Inc., Mountain View, CA (US)

( * ) Notice: Subject to any disclaimer, the term of this patent is extended or adjusted under 35 U.S.C. 154(b) by 460 days.

(21) Appl. No.: 12/730,959

(22) Filed: Mar. 24, 2010

Related U.S. Application Data

(60) Provisional application No. 61/173,935, filed on Apr. 29, 2009.

(51) Int. Cl.
*G06K 9/00* (2006.01)

(52) U.S. Cl.
USPC ............................................ 382/159; 382/182

(58) Field of Classification Search
USPC .................................. 382/112, 159, 176–190
See application file for complete search history.

(56) References Cited

U.S. PATENT DOCUMENTS

| 5,425,110 | A | * | 6/1995 | Spitz ............................. 382/192 |
| 5,444,797 | A | | 8/1995 | Spitz et al. |
| 5,933,525 | A | * | 8/1999 | Makhoul et al. ............... 382/186 |
| 6,005,986 | A | | 12/1999 | Ratner |
| 7,215,828 | B2 | * | 5/2007 | Luo ................................ 382/289 |
| 2005/0192802 | A1 | * | 9/2005 | Robinson et al. .............. 704/240 |

OTHER PUBLICATIONS

Rashid, S., et al., "Connected Component level Multiscript Identification from Ancient Document Images," DAS Conference, Boston, MA, Jun. 9-11, 2010, 4 Pages.

* cited by examiner

*Primary Examiner* — Wesley Tucker
(74) *Attorney, Agent, or Firm* — Remarck Law Group PLC

(57) ABSTRACT

A page layout module receives a page image displaying text in an unknown script and unknown orientation, determines a text section in the received image and transmits the text section to an orientation and script module. The orientation and script module comprises a training module, a classifier and a recognition module. The training module trains the classifier to identify connected components that include a connected portion of one or more characters of text. The recognition module uses the trained classifier to identify in the received text section a set of connected components. The recognition determines the likely orientation and script for the connected components and then uses the determined information to determine the orientation and script for the text section. The determined orientation and script for the text section is transmitted to the OCR module. The OCR module uses the determined orientation and script to recognize text in the text section.

24 Claims, 8 Drawing Sheets

TEXT SCRIPT AND ORIENTATION RECOGNITION

CROSS-REFERENCE TO RELATED APPLICATION

This application claims the benefit of U.S. Provisional Application No. 61/173,935, filed Apr. 29, 2009, which is hereby incorporated by reference in its entirety.

BACKGROUND

1. Field of Disclosure

The disclosure generally relates to the field of optical character recognition (OCR), in particular to determining text script and orientation.

2. Description of the Related Art

To accurately recognize the text in an image, optical character recognition (OCR) modules often utilize a great deal of prior knowledge, such as of the shapes of characters, lists of words and the frequencies and patterns with which they occur. Much of this knowledge is language-specific. This makes the language of the text contained in an image a crucial input parameter to specify when using an OCR algorithm.

Thus, it is desirable to identify the language of text being subject to an OCR process. In some situations, however, the language of the text is not known a priori and must be determined from the text itself. For example, the language of the text may be unknown when the text is drawn from a large corpus containing documents in a variety of different languages.

Often, it is desirable to identify the script in which the text appears as a prelude towards identifying the language. Identifying the script can limit the set of potential languages, and thus aid in machine-performed language identification. For example, if the script is identified as Cyrillic, then the possible languages of the text include Russian, Bulgarian and Ukrainian. If the script is identified as Latin, then the language is likely one of the at least 26 languages that use the Latin script. Some scripts, including many Indic scripts, such as Telugu, Kannada and Tamil, have only one language associated with them, and identifying the script inherently identifies the language of the text. Thus, determining the script in which a text is written either indicates the language of the text or simplifies the language determination process.

SUMMARY

The above-described and other issues are addressed by a computer-implemented method, computer-readable medium, and computer system for training a text recognition module to identify a script of text in an image. Embodiments of the method comprise receiving an image displaying known text in a known script, and identifying a set of connected components in the image, wherein a connected component comprises a portion of one or more characters of the known text in the known script. The method generates a set of word fragments using the set of connected components, wherein the word fragments comprise one or more connected components from the identified set and a portion of the known text corresponding to the one or more connected components. The method further comprises training the text recognition module to recognize text in the known script using one or more word fragments from the generated set.

Embodiments of the computer-readable medium store executable computer-program instructions for receiving an image displaying known text in a known script, and identifying a set of connected components in the image, wherein a connected component comprises a portion of one or more characters of the known text in the known script. The program instructions also comprise instructions for generating a set of word fragments using the set of connected components, wherein the word fragments comprise one or more connected components from the identified set and a portion of the known text corresponding to the connected component. Additionally, the program instructions comprise instructions for training the text recognition module to recognize text in the known script using one or more word fragments from the generated set.

Embodiments of the computer system comprise the above described computer-readable medium that stores instructions for training a text recognition module to identify a script of text in an image.

The above-described and other issues are also addressed by a computer-implemented method, computer-readable medium, and computer system for determining a script and orientation of text in an image. Embodiments of the method comprise receiving an image containing text in an unknown script. The method further comprises providing the set of connected components to a text recognition module, wherein the text recognition module has been trained using connected components comprising connected portions of one or more characters of text in a known script. In response to receiving the connected components set, the text recognition module produces outputs indicating likely scripts of the connected components. Additionally, the method comprises determining a script and an orientation of the text in the image responsive to the outputs of the text recognition module.

Embodiments of the computer-readable medium store instructions for implementing the above-described method for determining a script of text in an image.

Embodiments of the computer system include the above described computer-readable medium that stores instructions for implementing the above-described method for determining a script of text in an image.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The computing environment described herein enables determination of the script in which a text is written. The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
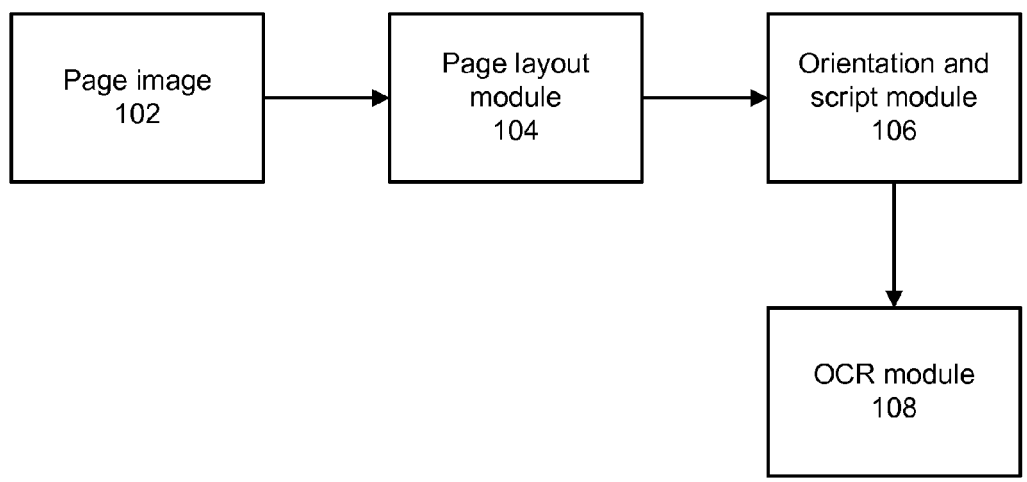
FIG. 1 is a block diagram illustrating a computing environment for recognizing characters in an image according to one embodiment of the present disclosure.

Referring to FIG. 1, the computing environment for recognizing characters comprises a page layout module 104, an orientation and script module 106 and an OCR module 108.

In one embodiment, the page layout module 104 receives a page image 102 as input, determines the layout of the page image 104, determines text sections in the page image 102 and outputs the determined text sections. In one embodiment, the page image 102 is extracted from a large corpus of documents written in different scripts. The page image 102 is a scanned image of a page from a document like a book, a magazine, a journal, a newspaper, a letter or a report. Alternatively, the page image 102 is a section of a scanned page from a document. A page in a book can include content in one or more possible layouts, i.e. the content on the page can be organized in one or more ways. For example, the text in a page can be written in two columns separated by half an inch of blank space. Alternatively, a page can include a figure in the middle and various sections of text surrounding the image. To determine various sections, the page layout module 104 determines the layout of a page image 102. In other words, the page layout module 104 determines various sections in the page image 102. The page layout module 104 initially identifies text and non-text sections in the page image 102 through one or more image processing techniques. The page layout module 104 then identifies the connected components and tab stops separating the connected components in the text sections. A connected component comprises a part or whole of one or more characters connected together as described below. The page layout module 104 deduces a set of column partitions from the detected tab stops and then determines polygonal boundaries of sections containing flowing text or headings. These sections are called the text sections.

The orientation and script module 106 receives a text section from the page layout module 104 and determines the orientation and script of the text in the text section. The orientation and script module 106 then transmits the determined orientation and script for the text section to the OCR module 108. The orientation and script module 106 also transmits the received text section to the OCR module 108. FIG. 1 illustrates one embodiment of the orientation and script module 106 and its coupling to other modules in the illustrated computing environment. Other embodiments of orientation and script module 106 and other modules in the computing environment can transmit data along different paths for achieving similar results.

The OCR module 108 receives from the orientation and script module 106 the text section, the orientation of the text in the text section and the script of the text. In one embodiment, the OCR module 108 receives the text section from the page layout module 104 instead of the orientation and script module 106. The OCR module 108 then determines the OCR'd text in the text section based on the received script and orientation of the text section. In one embodiment, the OCR module 108 saves the determined OCR'd text in a file. In another embodiment, the OCR module 108 transmits the OCR'd text to another module that renders the OCR'd text or performs another function on the OCR'd text.

Orientation and Script Module

Figure 2:
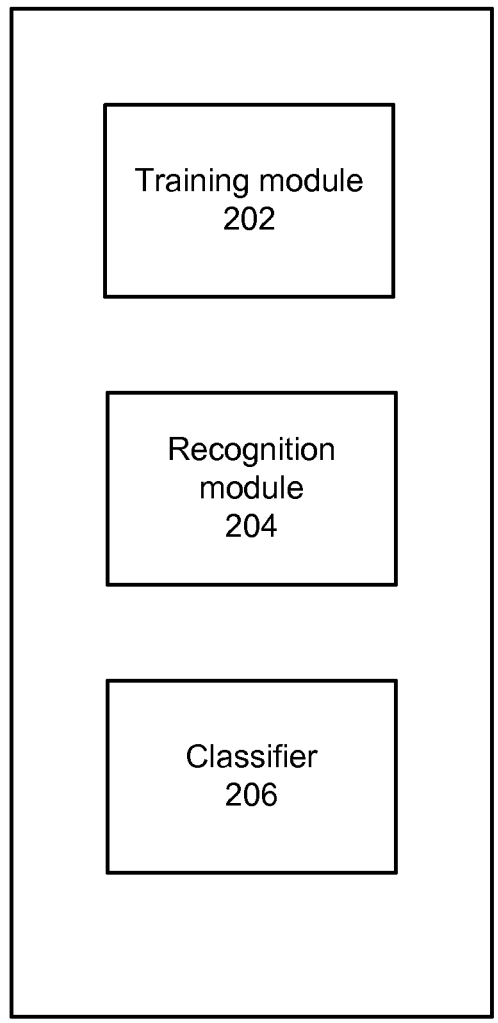
FIG. 2 is a block diagram illustrating an orientation and script module according to one embodiment of the present disclosure.

FIG. 2 is a block diagram illustrating the orientation and script module 106 according to one embodiment of the present disclosure. The orientation and script module 106 comprises a training module 202, a recognition module 204 and a classifier 206.

The training module 202 receives texts in known scripts and orientations, renders the texts into images and trains the classifier 206 to recognize the scripts of text in the rendered images. In one embodiment, the training module 202 trains multiple classifiers 206, each classifier 206 trained to recognize text in a particular script. In another embodiment, the training module 202 trains a single classifier 206 to recognize and distinguish among text in multiple scripts. For illustration purposes, the orientation and script module 106 is assumed to include a single classifier 206 trained to recognize text in multiple scripts. One of ordinary skill in the art will recognize that the functionality of this single classifier 206 can be implemented in multiple classifiers trained to recognize text in one or more scripts.

The classifier 206 is trained to receive an image of a connected component and determine the likelihood that the received connected component includes text in a particular script. The trained classifier 206 then outputs a confidence score indicating the likelihood that the received connected component includes text in a particular script. In one embodiment, the classifier 206 outputs multiple confidence scores and multiple scripts corresponding to the confidence scores. For example, the classifier 206 can receive connected component and output a first confidence score for Hebrew and a second confidence score for Arabic. The first confidence score implies the likelihood of the received connected component including text in the Hebrew script and the second confidence score implies the likelihood of the connected component including text in the Arabic script.

The recognition module 204 uses the trained classifier 206 to recognize text in images with unknown script and orientation. The recognition module 204 receives a text section from the page layout module 104, extracts from the text section connected components that include characters in the unknown script, and transmits the extracted connected components to the classifier 206 in various orientations. The classifier 206 determines confidence scores indicating the likelihoods that particular orientations of the characters in the connected components belong to particular scripts. The classifier 206 then transmits the determined confidence scores to the recognition module 204. The recognition module 204 accumulates the received scores and determines the orientation and script of text in the received text section based on the accumulated confidence scores. The recognition module 204 then transmits the determined orientation and script of the text section to the OCR module 108.

Training Module

Figure 3:
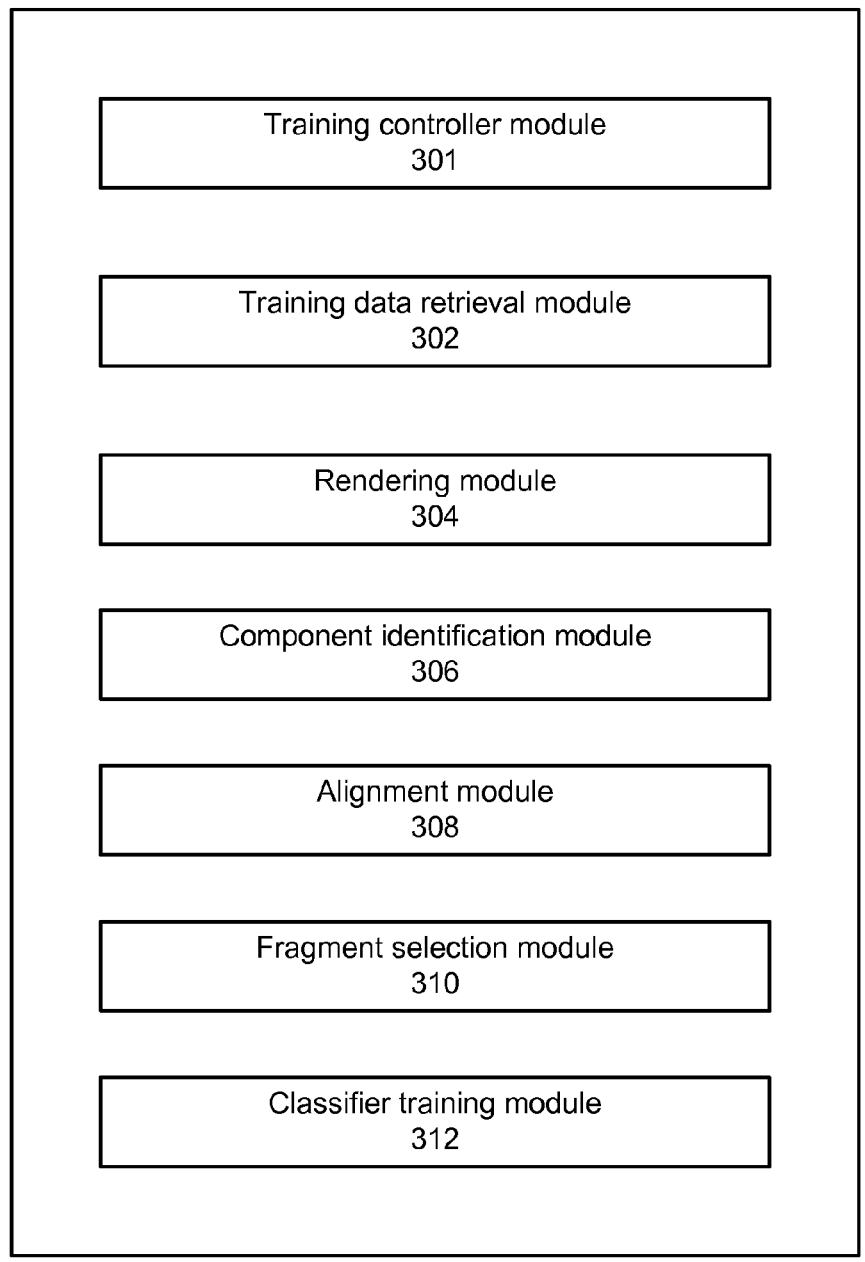
FIG. 3 is a block diagram illustrating a training module according to one embodiment of the present disclosure.

FIG. 3 is a block diagram illustrating the training module 202 according to one embodiment of the present disclosure. The training module 202 comprises a training controller 301, a training data retrieval module 302, a rendering module 304, a component identification module 306, an alignment module 308, a fragment selection module 310 and a classifier training module 312.

The training controller module 301 directs the various other modules in the training module 202 to execute their respective tasks at appropriate times. The training controller module 301 is communicatively coupled to all other modules in the training module 202.

The training data retrieval module 302 retrieves text used to train the classifier 206. In one embodiment, the training data retrieval module 302 crawls the web to retrieve text in different scripts. In another embodiment, the training data retrieval module 302 retrieves text from a data repository that stores text in different scripts. For example, certain training texts in the data repository can be designated and retrieved by the training data retrieval module 302. Regardless of the source of the retrieved text, the training data retrieval module 302 transmits the retrieved text to rendering module 304. In one embodiment, the training data retrieval module 302 retrieves and stores text in multiple scripts and transmits the text to the rendering module 304 in one script at a time so that the classifier 206 can be trained on one script at a time.

The rendering module 304 receives the retrieved text from the training data retrieval module 204 and renders the received text into an image containing the text in a particular typeface and font. For example, the rendering module 304 can render the received text into an image where the text is shown with the Times New Roman typeface with twelve point font size. The rendering module 304 transmits the rendered image to the component identification module 306.

The rendering module 304 also stores location information for the rendered text. The location information can be stored as metadata for the image and specifies the text at corresponding locations in the rendered image. The rendering module 306 also includes the known script of the text in the metadata for the rendered image. This metadata is helpful is training the classifier 206 as described below. In one embodiment, the classifier 206 can be trained without transmitting the known script of the text as metadata. Accordingly, in such an embodiment, the rendering module 306 does not include the known script of the text in the metadata.

The component identification module 306 receives the rendered image and its metadata, identifies the connected components in the image and transmits information about the connected components to the alignment module 308. The transmitted information about the connected components comprises the coordinates of bounding shapes surrounding the connected components in the image.

A connected component is a set of pixels in an image that are directly connected to each other or indirectly connected to each other through intermediate connected pixels. Two pixels are connected to each other if the pixels are spatially adjacent to each other and the pixel brightness for the pixels is within a pre-determined range of each other. The pixels are adjacent to each other if the pixels are 4-connected or 8-connected to each other. Additionally, pixel brightness is a value representing the pixel's color level for a given color or a combination of colors. For example, pixel brightness can be the black level for a pixel or pixel brightness can be a combination of the pixel's red level, blue level and green level.

Figure 8:
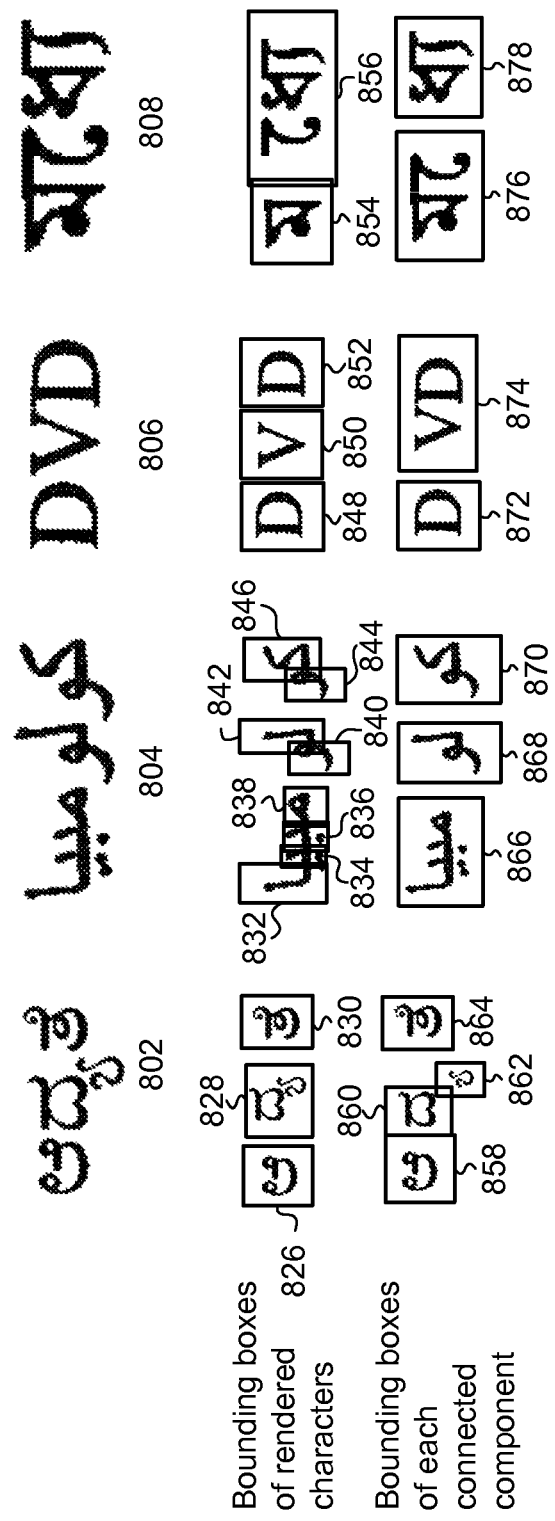
FIG. 8 illustrates examples of text images in multiple scripts and division of the text images into various components that are used to identify the script and orientation of text in the image according to one embodiment of the present disclosure.

A connected component can comprise a part or whole of one or more characters in a script. For example, the English character "i" has two parts, the stem and the dot, in close proximity of each other. Accordingly, these two separate parts are two separate connected components. FIG. 8 illustrates additional examples of connected components in multiple scripts including Kannada, Arabic, Latin and Bengali script.

FIG. 8 shows rendered images of words in these scripts, each word separated into bounding boxes containing characters forming the word and each word separated into bounding boxes containing connected components. For example, FIG. 8 includes "DVD" 806 which is a rendered word image in the Latin script. The "DVD" 806 word is separated into characters "D" 848, "V" 850 and "D" 852 enclosed by their corresponding bounding boxes, and the "DVD" 806 word is separated into connected components 872-874 enclosed by their bounding boxes. The bounding boxes around the characters and connected components are for illustration purposes and the bounding boxes are not part of the connected components or the characters. In addition to the Latin word 806, FIG. 8 includes a Kannada word 802 with corresponding Kannada characters 826-830 and connected components 858-864, an Arabic word 804 with corresponding Arabic characters 832-846 and connected components 866-870, and a Bengali word 808 with corresponding Bengali characters 854-856 and connected components 876-878.

As illustrated in FIG. 8, each connected component 858-878 is a set of spatially adjacent pixels with similar pixel brightness. The connected components 858-878 each comprise a set of pixels with similar black levels and the connected components 858-878 are separated from each other by the white pixels between them.

Additionally, the connected component 874 illustrates the case where a printing artifacts cause two characters that are usually not connected to be considered as one connected component. The characters 850 and 852 corresponding to the connected component 874 usually do not appear as a connected component in the Latin script. However, a printing artifact has caused the characters 850 and 852 to be connected at top and therefore the component identification module 306 identifies the two characters 850-852 as a connected component 874.

Moreover, because connected components comprise a set of spatially adjacent pixels with similar color levels, a connected component can comprise more than one character in a script. For example, the Arabic connected components 866-870 each comprise more than one Arabic character. The Arabic connected component 866 corresponds to four Arabic characters 832-838 connected together. Similarly, the Arabic connected components 868 and 870 each corresponds to two characters 840-842 and 844-846 respectively.

Also, a connected component can comprise only a part of a character or parts of more than one character. For example, the Bengali connected component 876 comprises the character 854 and part of the character 856. The Bengali connected component 878 comprises only part of character 856.

In sum, a connected component comprises a part or whole of one or more characters connected together. Returning to FIG. 3, the component identification module 306 receives the rendered image from the rendering module 304 and identifies connected components in the received image. To identify a connected component, the component identification module 306 applies known image processing techniques to determine a change in pixel brightness of adjacent pixels in the image. The component identification module 306 is pre-configured with the range of pixel brightness for pixels separating the connected components. The component identification module 306 analyzes the brightness of pixels in the image, determines the first pixel with pixel brightness other than the pixel brightness of the separating pixels and marks that pixel as a pixel belonging to a connected component. The component identification module 306 then determines the pixels adjacent to the first pixels and marks those pixels as part of the connected component if the adjacent pixels' brightness does not match the brightness of separating pixels. The component identification module 306 then repeats the same process for pixels adjacent to the pixels marked as part of the connected component. The component identification module 306 keeps marking the pixels as part of the same connected component until no additional pixels are left that are adjacent to the marked pixels and do not have the pixel brightness of separating pixels. After no adjacent pixels are left for marking, the component identification module 306 identifies the marked group of pixels as a connected component. The component identification module 306 then scans the image for additional pixels with pixel brightness that does not match the brightness of separating pixels. Next, the component identification module 306 repeats the marking process again to identify the next set of pixels as the next connected component. In this manner, the component identification module 306 identifies the connected components in the received rendered image. In other embodiments, the component identification module 306 identifies the connected components through other techniques known in the art.

The alignment module 308 aligns the connected components with their corresponding characters in the underlying text. An aligned group of one or more connected components and their corresponding characters is called a "word fragment." The alignment module 308 receives the determined information about the connected components (i.e. coordinates of bounding shapes around the connected components) from the component identification module 306. Additionally, the alignment module 308 receives the location information (i.e. coordinates in the text image and corresponding text present at those coordinates) from the rendering module 304.

The alignment module 308 then determines the overlap between the coordinates of the bounding boxes around the connected components and the coordinates of the text image. The alignment module 308 aligns the overlapping one or more connected components and the text image to generate word fragments. The alignment module 308 generates a word fragment that includes a connected component and its corresponding characters. An example of such a word fragment in FIG. 8 is a word fragment comprising connected component 866 and its corresponding four characters 832-838. The alignment module 308 also generates word fragments that include more than one connected component and their corresponding characters. An example of such a word fragment in FIG. 8 is a word fragment comprising connected components 876-878 and their corresponding characters 854-856. In this example, the word fragment comprises two connected components 876-878 because parts of character 856 are present in both connected components 876-878. Additionally, the alignment module 308 can generate word fragments comprising more than two connected components and a corresponding character because two connected components combine to make a single character. For example, the character "i" corresponds to two connected components: the stem and the dot. The alignment module 308, at times, also generates word fragments comprising a connected component corresponding to two characters that have been connected because of a printing artifact. An example of such a word fragment is a word fragment comprising connected component 874 and corresponding characters 850-852. In one embodiment, the alignment module 308 generates word fragments that include information about the connected component instead of the connected component itself. Such information can include coordinates or another reference to an image that includes the connected component.

The fragment selection module 310 receives word fragments generated by the alignment module 308 and selects for training the classifier 206 a subset of word fragments from the received word fragments. The fragment selection module 310 selects the fragment set based on one or more factors like the frequency with which characters in a word fragment are used in text written in the character's script, number of characters in a word fragment, number of connected components in a word fragment and complexity of a connected component's shape. In one embodiment, the fragment selection module 310 first ranks the word fragments in decreasing order of frequency with which the characters in the word fragments appear in the training document corpus. For example, assume that the appearance frequency in training corpus for Latin letter "t" is 9%, letter "h" is 6% and letter "e" is 12%. The fragment selection module 310 ranks a word fragment including Latin letter "t" higher than a word fragment including letter "h" because letter "t" has a higher appearance frequency than letter "h."

In the case where a word fragment includes more than one letter, the fragment selection module 310 either ranks the word fragments based on the letter appearance frequency or the word appearance frequency. In the case of rank based on the word appearance frequency, the fragment selection module 310 ranks a word fragment higher than another word fragment if the word fragment includes a word that appears more frequently in the training document corpus than the word included in the other word fragment. For example, the fragment selection module 310 ranks a word fragment with text including the word "the" higher than a word fragment including the word "teeth" because the word "the" appears more frequently than the word "teeth" in Latin text. In the case of rank based on letter appearance frequency, the fragment selection module 310 assigns a weight to various letters in text included in a word fragment based on the letters' frequency of appearance in the training document corpus, calculates an average weighted score for text appearing in each word fragment and ranks the word fragments in order of decreasing weighted score. For example, the fragment selection module 310 calculates the average weighted score of word fragment including word "the" as 9 (i.e. (9+6+12)/3) and the average weighted score of word fragment including word "teeth" as 9.6 (i.e. (9+12+12+9+6)/5). Accordingly, the fragment selection module 310 ranks the word fragment including the word "teeth" above the word fragment including the word "the."

If frequencies of two word fragments are within a pre-determined margin, the fragment selection module 310 re-ranks the two word fragments in increasing order of the number of characters in the word fragment. Referring to the letter appearance frequency-based ranking example above, if the pre-determined margin is one, then the word fragment including "the" would be ranked higher than the word fragment including "teeth" because the difference between their frequency score is less than one (0.6) and "the" has fewer characters than "teeth."

If the number of characters in the two word fragments are within a pre-determined margin, the fragment selection module 310 re-ranks the two word fragments in increasing order of complexity of the connected components' shapes in the word fragments. In one embodiment, the fragment selection module 310 ranks the received word fragments based on other criteria than those described above.

Once the word fragments are ranked, the fragment selection module 310 selects the top n % (wherein n is a decimal or a fraction), for example the top 10%, of the ranked word fragments as the selected fragment set. The fragment selection module 310 also receives feedback like the error rate for the classifier 206 trained with a selected set and can vary the selection based on the feedback. For example, the fragment selection module 310 can select a larger set of ranked word fragments in response to feedback indicating that the error rate of the classifier 206 exceeds a predetermined level.

The classifier training module 312 receives from the fragment selection module 310 the selected set of word fragments and the known script for the characters in the word fragments. The classifier training module 312 then trains the classifier 206 with the received word fragment set and tests the trained classifier with a set of test images. The test images are images of page documents having text in known scripts.

The classifier training module 312 then analyzes the results of the test and determines the error rate for the classifier 206. In one embodiment, the classifier training module 312 determines the error rate based on the most likely script determined by the classifier 206 for a set of connected components in one or more test images. The classifier training module 312 receives the likely scripts and associated confidence scores for a connected component from the classifier 206. The classifier training module 312 then selects the script with the highest confidence score as the likely script for the connected component and compares the selected script with the known script for the connected component. The classifier training module 312 repeats this process for a set of connected components and calculates the error rates based on the number of times the classifier 206 correctly identified the script for a connected component.

In another embodiment, the classifier training module 312 selects multiple sets of connected components. The classifier training module 312 then uses the classifier 206 to determine the likely script of each component in the multiple sets. For each set, the classifier training module 206 determines a script associated with the most amount of connected components. The classifier training module 206 then compares the determined script for each set with the known script for that set. Next, the classifier training module 206 determines the error rate for the classifier 206 based on the number of sets with the correctly determined script.

Regardless of how the classifier training module 312 determines the error rate, the classifier training module 312 determines if the training set needs to be readjusted based on the determined error rate. If the error rate exceeds a pre-determined threshold, the classifier training module 312 requests an adjusted word fragment set from the fragment selection module 310. In one embodiment, the classifier training module 312 transmits to the fragment selection module 310 the determined error rate with the request for the adjusted word fragment set. The classifier training module 312 then receives the readjusted set, trains the classifier 206 with the readjusted set, tests the classifier 206 with test images and determines the error rate for the classifier 206. The classifier training module 312 keeps readjusting the training set until the error rate falls below the pre-determined threshold or the error rate does not decrease.

Recognition Module

Figure 4:
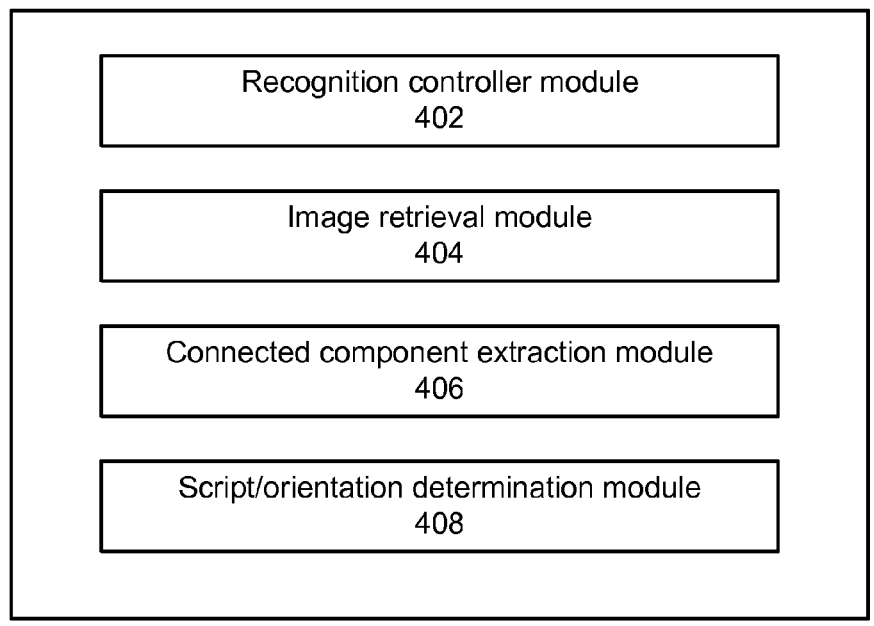
FIG. 4 is a block diagram illustrating a recognition module according to one embodiment of the present disclosure.

FIG. 4 is a block diagram illustrating a recognition module 204 according to one embodiment of the present disclosure. The recognition module 204 comprises a recognition controller module 402, an image retrieval module 404, a connected component extraction module 406 and a script/orientation determination module 408.

The recognition controller module 402 directs various modules in the recognition module 204 to execute their respective tasks at appropriate times. The recognition controller module 402 is communicatively coupled to the other modules in the recognition module 204.

The image retrieval module 404 retrieves or receives the text section from the page layout module 104 and transmits the retrieved section to the connected component extraction module 406.

The connected component extraction module 406 receives the retrieved text section from the image retrieval module 404, extracts the connected components from the received text section and transmits the extracted connected components to the script/orientation determination module 408. The connected component extraction module 406 identifies and extracts connected components by applying image processing techniques similar to the techniques applied by the component identification module 306. The transmitted connected components are used to determine the script and orientation of the text section including those connected components. However, some connected components are not appropriate for determining the script and orientation of a text section. For example, large connected components (i.e. connected components with a number of connected pixels beyond a threshold) are more likely to be non-text content included in the text section. Accordingly, in one embodiment, the component extraction module 406 does not transmit such connected components to the script/orientation determination module 408.

The script/orientation determination module 408 receives the extracted connected components from the connected component extraction module 406 and determines the script and orientation of the text section received by the connected component extraction module 406. The script/orientation determination module 408 receives the identified connected components from the connected component extraction module 406 and transmits a received connected component to the classifier 206 in a first orientation. The script/orientation determination module 408 then receives from the classifier 206 the scripts and the corresponding confidence scores indicating the likelihood of the connected component belonging to the scripts. Next, the script/orientation determination module 408 saves the highest confidence score and the corresponding script for the connected component in the first orientation. The script/orientation determination module 408 then rotates the received connected component by a predetermined amount, for example 90 degrees, transmits the connected component in its new orientation to the classifier 206, receives the scripts and the corresponding confidence scores, and saves the highest confidence score and the corresponding script for the connected component in the new orientation. The script/orientation determination module 408 again rotates the connected component to achieve another orientation and repeats the above mentioned steps for the connected component in the new orientation. After the script/orientation determination module 408 repeats the above mentioned steps for all the desired orientations, the script/orientation determination module 408 determines the likely script and orientation of the connected component.

The likely orientation and script of the connected component is the orientation and script with the highest confidence score for belonging to a particular script. Accordingly, the script/orientation determination module 408 saves the orientation with the highest confidence score as the likely orientation, saves the corresponding script as the likely script and saves the corresponding confidence score.

The script/orientation determination module 408 then determines and saves the highest confidence score, the corresponding likely orientation and the corresponding likely script for each of the remaining received connected components. In one embodiment, the script/orientation determination module 408 does not repeat this process for all the received connected components. Instead, the script/orientation determination module 408 checks if a stopping criterion has been met after determining the likely orientation and script for a connected component. Examples of stopping criterion include determining that a threshold number of connected components have the same likely orientation, same likely script or both.

Next, the script/orientation determination module 408 determines the likely orientation of the text section based on the connected components' saved highest confidence scores and their corresponding orientations. The script/orientation determination module 408 groups the connected components based on their likely orientations. For example, consider a connected component set of seven connected components with following highest confidence scores, the orientation associated with that score and the script associated with that score: (0.9, 0°, Kannada), (0.7, 0°, Kannada), (0.8, 0°, Bengali), (0.6, 90°, Arabic), (0.6, 90°, Kannada), (0.4, 270°, Bengali) and (0.2, 270°, Latin). In this set, the three connected components with 0° orientation (i.e., in the normal reading orientation) are grouped together, the two connected components with 90° orientation (i.e., rotated 90° clockwise from the reading orientation) are grouped together, and the remaining two connected components with 270° orientation (i.e., rotated 270° clockwise from the reading orientation) are grouped together. After the connected components are grouped under the appropriate orientation, the confidence scores are tallied for every orientation. To tally the score for each orientation, the confidence scores associated with the likely orientation of connected components grouped under an orientation are tallied. Referring to the example again, the 0° orientation has three connected components with corresponding confidence scores of 0.9, 0.7 and 0.8. Accordingly the tallied confidence score for this is 2.4. Similarly, the tallied confidence score for the 90° orientation is 1.2, for the 270° orientation is 0.6 and for any remaining orientation is 0 (because the other orientations did not have any connected components grouped under those orientations). The script/orientation determination module 408 then determines orientation of the text section as the orientation with the highest tallied confidence score. In the example above, the script/orientation determination module 408 would select 0° as the orientation for the text section because this orientation has the highest tallied score of 2.4. The method described above is an illustration of one of many methods that can be used to determine the orientation of the text section. Other variations of this method will be apparent to one of ordinary skill in the art upon reading this disclosure.

Next, the script/orientation determination module 408 determines the script for the text section. For determining the script, the script/orientation determination module 408 analyzes the connected components grouped under the orientation that is selected as the orientation of the text section. In the example above, the selected orientation is the 0° orientation and therefore the three connected components grouped under this orientation are analyzed. The script/orientation determination module 408 determines the script associated with the likely orientation for each connected component grouped under the selected orientation. The script/orientation determination module 408 tracks the number of connected components associated with a particular script in the selected orientation group. The script/orientation determination module 408 then determines the script with the highest number of associated connected components as the script for the text section. Referring to the example again, the scripts associated with the three components grouped under the 0° orientation are Kannada, Bengali and Kannada. The script/orientation determination module 408 therefore would determine Kannada as the script for the example set of connected components because the Kannada script is associated with two connected components in the 0° orientation group, the Bengali script is associated with one connected component and no other script is associated with connected components grouped under the this orientation.

After determining the orientation and script for the text section, the script/orientation determination module 408 transmits the determined information to the OCR module 108.

Computer Architecture

Figure 5:
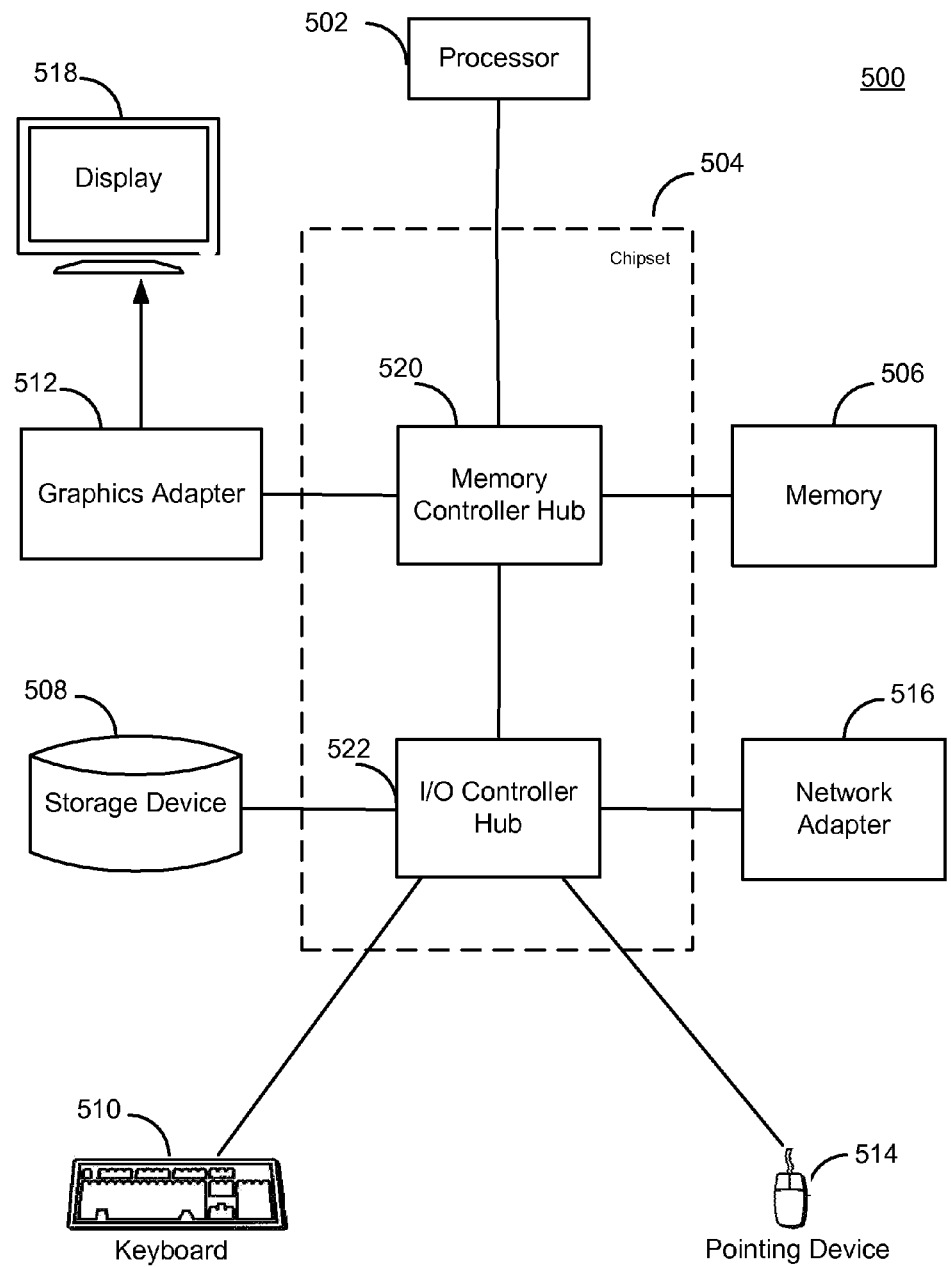
FIG. 5 is a block diagram illustrating an example of a computer for use in the computing environment shown in FIG. 1 according to one embodiment of the present disclosure.

The entities shown in FIGS. 1-4 are implemented using one or more computers. FIG. 5 is a high-level block diagram illustrating an example computer 500. The computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, keyboard 510, pointing device 514, and network adapter 516 are coupled to the I/O controller hub 522. Other embodiments of the computer 500 have different architectures.

The storage device 508 is a non-transitory computer-readable storage medium such as a hard drive, compact disk read-only memory (CD-ROM), DVD, or a solid-state memory device. The memory 506 holds instructions and data used by the processor 502. The pointing device 514 is a mouse, track ball, or other type of pointing device, and is used in combination with the keyboard 510 to input data into the computer system 500. The graphics adapter 512 displays images and other information on the display 518. The network adapter 516 couples the computer system 500 to one or more computer networks.

The computer 500 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 508, loaded into the memory 506, and executed by the processor 502.

The types of computers 500 used by the entities of FIGS. 1-4 can vary depending upon the embodiment and the processing power required by the entity. For example, the Orientation and script module 106 might comprise multiple blade servers working together to provide the functionality described herein. The computers 500 can lack some of the components described above, such as keyboards 510, graphics adapters 512, and displays 518.

Training Method

Figure 6:
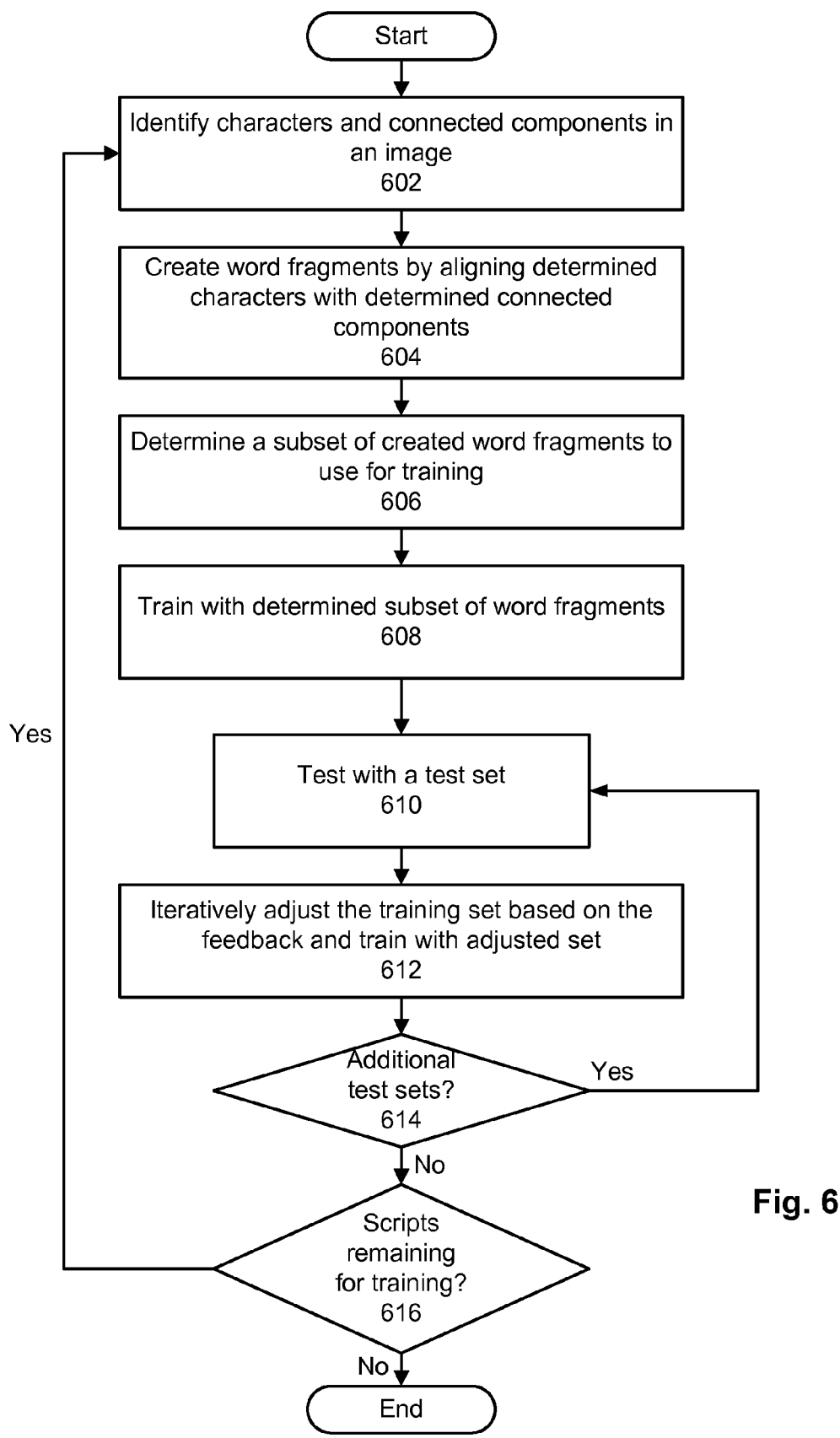
FIG. 6 is a flow diagram illustrating a method for training a classifier to recognize a script and orientation of text in an image according to one embodiment of the present disclosure.

FIG. 6 is a flow diagram illustrating a method for training a classifier 206 to recognize a script and orientation of text in an image according to one embodiment of the present disclosure. The training module 202 retrieves content with a known script, renders text from the retrieved content into an image and identifies 602 the connected components and their corresponding characters in the image. Next, the training module creates 604 word fragments comprising connected components and their corresponding characters. The training module 202 then determines 606 a training subset of the created word fragments and trains 608 the classifier 206 with the determined subset. Next, the training module 202 tests 610 the classifier 206 for its accuracy in determining the script and orientation of text in a given text section. The training module 202 then receives feedback on the performance of the classifier 206. Based on the feedback, the training module 202, if required, iteratively adjusts 612 the training set and trains the classifier 206 with the adjusted training set. The training module 202 next determines 614 if additional test sets are available, required or desired to train the classifier 206. If additional sets are available, required or desired, the training module 202 repeats steps 610-614 for additional test sets. Otherwise, the training module 202 determines 616 if the classifier 206 should be trained for recognizing additional scripts. If yes, the training module 202 repeats steps 612-616 for each additional script.

Orientation and Script Recognition Method

Figure 7:
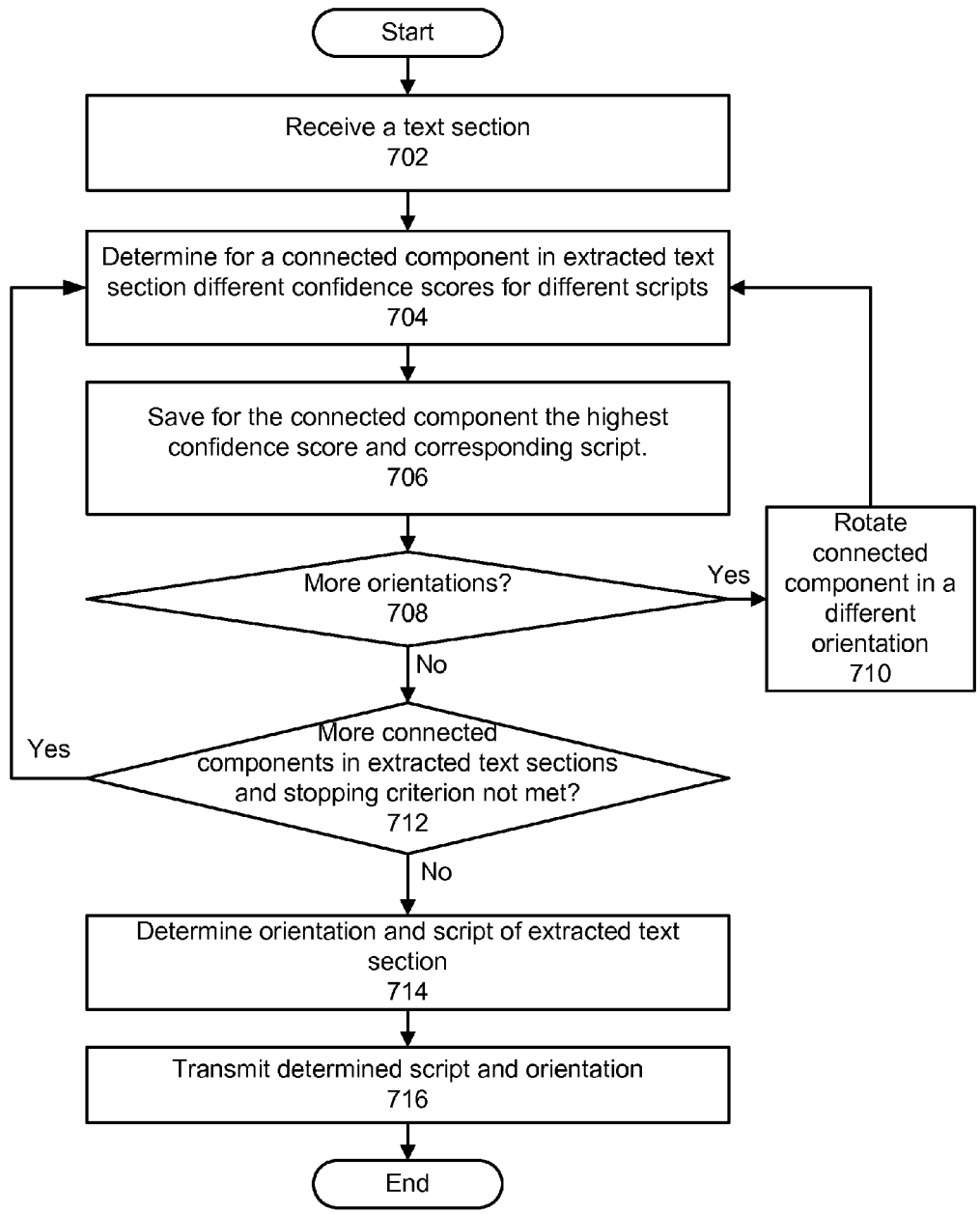
FIG. 7 is a flow diagram illustrating a method for determining orientation and script of text in an image according to one embodiment of the present disclosure.

FIG. 7 is a flow diagram illustrating a method for determining the orientation and script of text in an image according to one embodiment of the present disclosure. The recognition module 204 receives 702 a text section from a page image and identifies connected components in the received text section. The recognition module 204 then determines 704 confidence scores indicating the likelihood that an identified connected component includes text in a particular script. The recognition module 204 then saves 706 for the connected component the highest confidence score, the corresponding orientation and the script corresponding to the highest confidence score. The recognition module 204 next determines 708 if confidence scores for the connected component should be determined in more orientations. If yes, the recognition module 204 rotates 710 the connected component in a desired orientation and repeats steps 704-708.

After the recognition module 204 determines that steps 704-708 need not be performed for additional orientations, the recognition module 204 determines 712 if the recognition module 204 has analyzed sufficient connected components. Accordingly, if additional connected components remain in the text section and the stopping criterion has not been met, the recognition module 204 repeats steps 704-712 for the next connected component. Otherwise, the recognition module 204 has collected sufficient confidence scores to determine the orientation and script of the received image section. Accordingly, the recognition module 204 determines 714 the orientation and script of the image section as described above. The recognition module 204 then transmits 716 the determined script and orientation for the image section to OCR module 108.

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the art to most effectively convey the substance of their work to others skilled in the art. An algorithm is here, and generally, conceived to be a self-consistent sequence of steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The operations described herein can be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose computing systems including a processor, memory, non-volatile storage, input device and output device may be used with programs in accordance with the teachings herein, or it may prove convenient to construct more specialized apparatus to perform the required method steps. The required structure for a variety of these systems will appear from the description below. In addition, the system and its operations are not described with reference to any particular programming language. It will be appreciated that a variety of programming languages may be used to implement the system and its operations as described herein.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

Also, some embodiments of the system may be further divided into logical modules. One of ordinary skill in the art will recognize that a computer or another machine with instructions to implement the functionality of one or more logical modules is not a general purpose computer. Instead, the machine is adapted to implement the functionality of a particular module. Moreover, the machine embodiment of the system physically transforms the electrons representing various parts of an image into electrons representing OCR'd text.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

What is claimed is:

1. A computer-implemented method for determining a script of text in an image, the method comprising:
   receiving, at a computer including one or more processors, an image containing text in an unknown script;
   identifying, at the computer, a first set of connected components in the image, a connected component comprising a connected portion of one or more characters of the text in the unknown script;
   providing, at the computer, the first set of connected components to a text recognition module, the text recognition module producing in response outputs indicating likely scripts of the connected components of the first set, the text recognition module trained using a set of word fragments generated using a second set of connected components and a known script, the second set of connected components comprising connected portions of one or more characters of a known text in the known script, each word fragment comprising: (i) a particular connected component of the set of connected components, and (ii) at least a portion of the one or more characters of the known text corresponding to the particular connected component; and
   determining, at the computer, a script of the text in the image responsive to the outputs of the text recognition module.

2. The method of claim 1 wherein the text recognition module outputs, in response to a provided connected component, possible scripts for the text and corresponding confidence scores, each confidence score representing a likelihood of the provided connected component being associated with the possible script for the text.

3. The computer-implemented method of claim 1, further comprising:
   rotating the set of connected components into a plurality of rotated orientations, wherein the connected components are provided to the text recognition module in the plurality of rotated orientations; and
   determining an orientation of the script of the text in the image using outputs of the text recognition module produced in response to the connected components in the plurality of rotated orientations.

4. The computer-implemented method of claim 3, wherein the text recognition module outputs confidence scores indicating likelihoods that the provided connected components belong to one of a plurality of possible scripts and wherein determining the orientation of the script comprises:
   analyzing the confidence scores output by the text recognition module in response to the connected components in the plurality of rotated orientations to determine the orientation of the script.

5. The computer-implemented method of claim 1 wherein the text recognition module outputs confidence scores indicating likelihoods that the provided connected components belong to one of a plurality of possible scripts and wherein determining the script of the text comprises:
   analyzing the confidence scores output by the text recognition module to determine the script of the text in the image.

6. The computer-implemented method of claim 1, wherein identifying a connected component in the first set of connected component comprises selecting a set of pixels in the image, the pixels adjacent to other pixels in the connected component and having a pixel brightness within a pre-determined range of the other pixels in the connected component.

7. The computer-implemented method of claim 1, wherein identifying the first set of connected components comprises:
   identifying a complete set of connected components in the image;
   identifying large connected components in the complete set of connected components; and
   removing the large connected components from the complete set to obtain the first set of connected components.

8. The computer-implemented method of claim 7, wherein a particular connected component is identified as a large connected component when the particular connected component includes a number of connected pixels greater than a threshold.

9. A non-transitory computer-readable storage medium storing executable computer program instructions for determining a script of text in an image, the computer program instructions comprising instructions for:
   receiving an image containing text in an unknown script;
   identifying a first set of connected components in the image, a connected component comprising a connected portion of one or more characters of the text in the unknown script;

providing the first set of connected components to a text recognition module, the text recognition module producing in response outputs indicating likely scripts of the connected components of the first set, the text recognition module trained using a set of word fragments generated using a second set of connected components and a known script, the second set of connected components comprising connected portions of one or more characters of a known text in the known script, each word fragment comprising: (i) a particular connected component of the set of connected components, and (ii) at least a portion of the one or more characters of the known text corresponding to the particular connected component; and determining a script of the text in the image responsive to the outputs of the text recognition module.

10. The computer-readable storage medium of claim 9, wherein the text recognition module outputs, in response to a provided connected component, possible scripts for the text and corresponding confidence scores, each confidence score representing a likelihood of the provided connected component being associated with the possible script for the text.

11. The computer-readable storage medium of claim 9, wherein the computer program instructions further comprise instructions for:

rotating the set of connected components into a plurality of rotated orientations, wherein the connected components are provided to the text recognition module in the plurality of rotated orientations; and determining an orientation of the script of the text in the image using outputs of the text recognition module produced in response to the connected components in the plurality of rotated orientations.

12. The computer-readable storage medium of claim 11, wherein the text recognition module outputs confidence scores indicating likelihoods that the provided connected components belong to one of a plurality of possible scripts and wherein determining the orientation of the script comprises:

analyzing the confidence scores output by the text recognition module in response to the connected components in the plurality of rotated orientations to determine the orientation of the script.

13. The computer-readable storage medium of claim 9, wherein the text recognition module outputs confidence scores indicating likelihoods that the provided connected components belong to one of a plurality of possible scripts and wherein determining the script of the text comprises:

analyzing the confidence scores output by the text recognition module to determine the script of the text in the image.

14. The computer-readable storage medium of claim 9, wherein identifying a connected component in the first set of connected component comprises selecting a set of pixels in the image, the pixels adjacent to other pixels in the connected component and having a pixel brightness within a pre-determined range of the other pixels in the connected component.

15. The computer-readable storage medium of claim 9, wherein identifying the first set of connected components comprises:

identifying a complete set of connected components in the image;

identifying large connected components in the complete set of connected components; and removing the large connected components from the complete set to obtain the first set of connected components.

16. The computer-readable storage medium of claim 15, wherein a particular connected component is identified as a large connected component when the particular connected component includes a number of connected pixels greater than a threshold.

17. A computer system, comprising:

one or more processors; and a non-transitory computer-readable storage medium storing executable computer program instructions that, when executed by the one or more processors, cause the computer system to perform operations for determining a script of text in an image, the operations comprising:

receiving an image containing text in an unknown script;

identifying a first set of connected components in the image, a connected component comprising a connected portion of one or more characters of the text in the unknown script;

providing the first set of connected components to a text recognition module, the text recognition module producing in response outputs indicating likely scripts of the connected components of the first set, the text recognition module trained using a set of word fragments generated using a second set of connected components and a known script, the second set of connected components comprising connected portions of one or more characters of a known text in the known script, each word fragment comprising: (i) a particular connected component of the set of connected components, and (ii) at least a portion of the one or more characters of the known text corresponding to the particular connected component; and determining a script of the text in the image responsive to the outputs of the text recognition module.

18. The computer system of claim 17, wherein the text recognition module outputs, in response to a provided connected component, possible scripts for the text and corresponding confidence scores, each confidence score representing a likelihood of the provided connected component being associated with the possible script for the text.

19. The computer system of claim 17, wherein the operations further comprise:

rotating the set of connected components into a plurality of rotated orientations, wherein the connected components are provided to the text recognition module in the plurality of rotated orientations; and determining an orientation of the script of the text in the image using outputs of the text recognition module produced in response to the connected components in the plurality of rotated orientations.

20. The computer system of claim 19, wherein the text recognition module outputs confidence scores indicating likelihoods that the provided connected components belong to one of a plurality of possible scripts and wherein determining the orientation of the script comprises:

analyzing the confidence scores output by the text recognition module in response to the connected components in the plurality of rotated orientations to determine the orientation of the script.

21. The computer system of claim 17, wherein the text recognition module outputs confidence scores indicating likelihoods that the provided connected components belong to one of a plurality of possible scripts and wherein determining the script of the text comprises:

analyzing the confidence scores output by the text recognition module to determine the script of the text in the image.

22. The computer system of claim 17, wherein identifying a connected component in the first set of connected component comprises selecting a set of pixels in the image, the pixels adjacent to other pixels in the connected component and having a pixel brightness within a pre-determined range of the other pixels in the connected component.

23. The computer system of claim 17, wherein identifying the first set of connected components comprises:
   identifying a complete set of connected components in the image;
   identifying large connected components in the complete set of connected components; and
   removing the large connected components from the complete set to obtain the first set of connected components.

24. The computer system of claim 23, wherein a particular connected component is identified as a large connected component when the particular connected component includes a number of connected pixels greater than a threshold.

\* \* \* \* \*